United States Patent Office 2,716,210
Patented Aug. 23, 1955

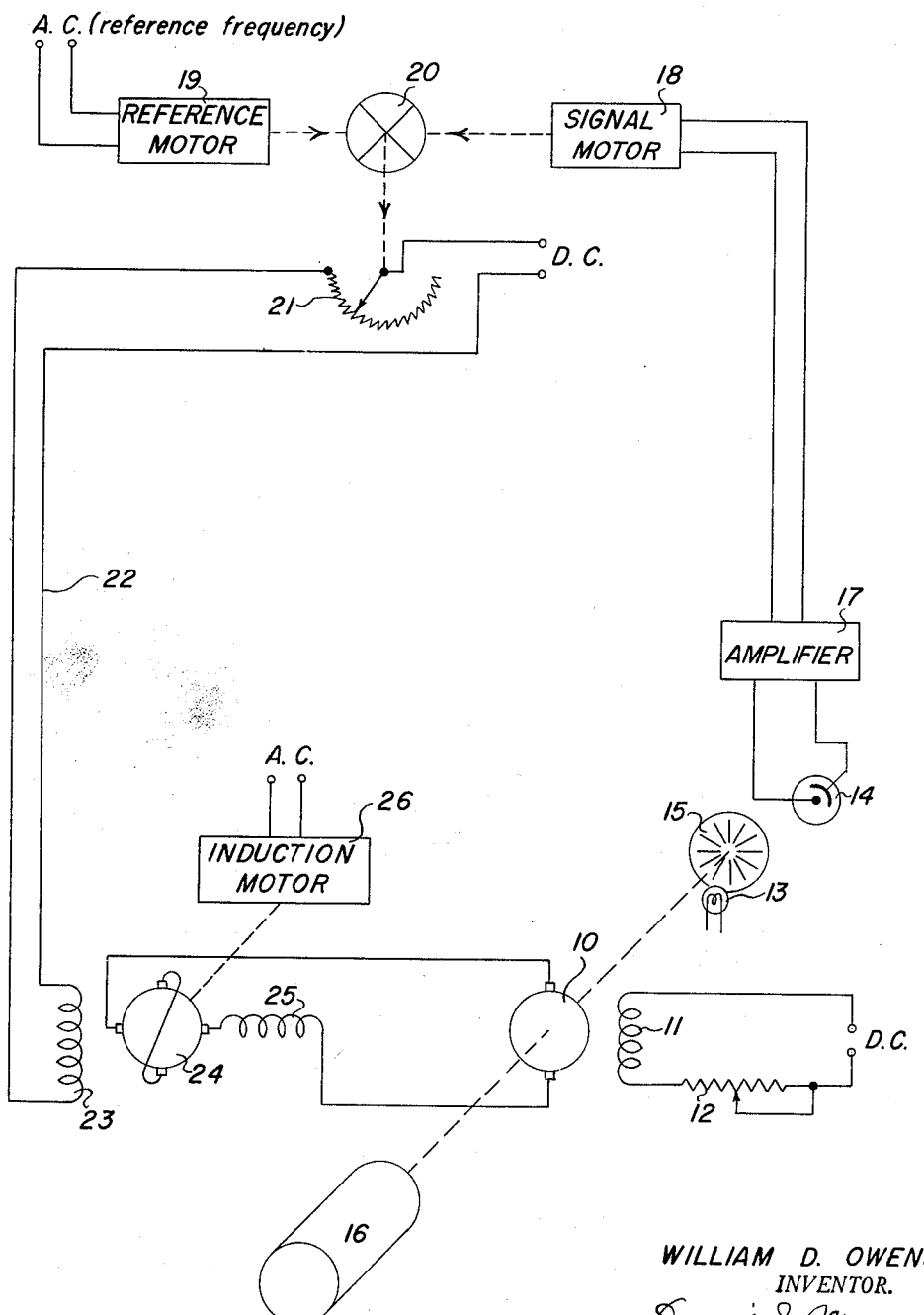

2,716,210

ELECTROMECHANICAL SPEED REGULATOR FOR MOTOR

William D. Owens, Minneapolis, Minn., assignor to Eastman Kodak Company, Rochester, N. Y., a corporation of New Jersey Application December 4, 1952, Serial No. 324,052

7 Claims. (Cl. 318—146)

This invention relates to speed control and more particularly to an electromechanical speed regulator for a motor.

There are many industrial processes that require that the speed of a machine when once set at a certain value continue to run at that speed with practically no deviation. The photographic, textile, paper and chemical industries are just a few in which speed regulation is of paramount importance. In the photographic industry, for example, the process of emulsion coating requires not only extremely accurate speed regulation in order that uniform coatings may be obtained but also that that regulation be slow and smooth in its action to preclude the introduction of crosslines due to sudden variations in emulsion thickness resulting from the inrtduction of sudden corrections of large amplitude in the machine speed. Of almost as much importance as highly accurate speed control in the above application is the ability of a regulator system to reproduce machine speeds with considerable exactitude at any subsequent time in order to duplicate coatings made earlier.

Numerous speed regulating devices have been designed and used with some degree of success. All of these have been found wanting in one or more respects, however. Many failed to provide the necessary high degree of accuracy to maintain substantially uniform speeds over long periods. In others, the range of speed within accurate control could be maintained was extremely narrow, necessitating the use of auxiliary control devices to bring the speed within a few percent of the desired value before the regulator coud take command. In still others the correction afforded lacked the slow, smooth action which was highly desirable in a coating machine. Again, many such prior art devices lacked the exact reproducibility, above referred to, in order that coatings made earlier could be subsequently duplicated.

The device embodying the present invention is electromechanical in its operation. It overcomes each of the above deficiencies of prior art devices and is extremely well adapted for motors driving photographic emulsion coating machines, although its use is obviously not limited thereto. In its preferred form, the present device employs two small synchronous motors, one a reference motor, the other a signal motor. The former, operating on a power line of constant frequency runs at constant speed. The signal motor is, however, driven by the amplified signal from a photoelectric pickup which is adapted to scan a radially ruled disc which is driven by the drive motor whose speed is to be regulated. The number of lines on the disc will determine the speed at which the drive motor is held to. When the latter operates at its predetermined speed, the speed of the signal motor will be identical to that of the reference motor. Since the output from each of the signal and reference motors is fed into a differential, the rotation of the output shaft of the differential will be a measure of the difference of these speeds, the output shaft being stationary when the speeds of the two synchronous motors are identical. The output shaft of the differential is connected to a rheostat or potentiometer by means of which the control field current of an amplidyne generator will be varied in response to changes in the speed of the motor under control. The output of the amplidyne generator, which will vary with the change in the excitation of the control field, is supplied to the armature of the drive motor, thus automatically regulating the speed thereof.

It is significant of the regulator device, herein described, that an inherently high degree of accuracy is obtainable in a very compact, simple device. The latter feature insures a low initial cost and ease of maintenance. While the regulator herein described has the limitation of not affording a continuously variable, stepless choice of speeds, this is no drawback in the intended application of the device since the speed at which the motor will be held is determined by the number of radial lines on the disc which is scanned by the photoelectric pickup and to change speeds it is necessary only to substitute a different disc. Once a speed is chosen and the appropriate disc attached, it is possible to maintain it or duplicate it at any subsequent time with a high degree of accuracy. Moreover, the present device provides speed correction which is relatively slow and smooth in its operation which is highly desirable in an emulsion coating machine.

It is, therefore, an object of the present invention to provide a new and improved speed regulating device.

It is a further object of this invention to provide a speed regulating device which is inherently highly accurate in its operation and which will automatically maintain a motor at a substantially uniform speed over long periods.

It is a still further object of this invention to provide a speed regulator which is not limited to correcting only for changes in load but will correct speed variations resulting from such other disturbances as gear friction, temperature changes, line voltage changes, weak excitation, resistance variations, etc.

It is a still further object of this invention to provide a device of the character described which provides automatic speed correction which is relatively slow and smooth in its operation.

It is a still further object to provide a device of the character described which permits substantially exact reproducbility of motor speeds at any subsequent time.

It is a still further object to provide a device of the character described which is simple and compact, has a low initial cost and requires relatively little maintenance.

Other objects and advantages of the invention will become apparent from the following description taken in connection with the accompanying drawing and it will be understood that many changes may be made in the details of construction and arrangement of parts shown and described without departing from the spirit of the invention as expressed in the accompanying claims. I, therefore, do not wish to be limited to the exact details shown and described as the preferred form only has been shown by way of illustration.

The preferred embodiment of the invention is diagrammatically illustrated in the single figure of the drawing. The direct current motor 10, whose speed is to be controlled, is shown driving the load 16. The field 11 of the drive motor 10 is excited from a constant direct current supply, a rheostat 12 being included in the motor field circuit for presetting the motor speed in the conventional manner. The function of the speed regulator which embodies the present invention is to maintain this preset speed substantially constant despite changes in load, temperature changes, line voltage changes, etc., each of which would normally tend to vary the motor speed.

Means are employed which provide an exact and a continuous measure of the motor speed which means place no additional load upon the motor under control. In the preferred form a radially ruled, transparent plastic disc 15 is driven by the motor 10, the disc being photoelectrically scanned. For this purpose a source of illumination 13 and a photoelectric cell 14 are employed, the ruled disc 15 being positioned in the path of light between the source of illumination 13 and the cell 14 whereby the light beam is cut or interrupted with a frequency which will be proportional to the speed of the motor 10. As a result thereof, the photoelectric cell will generate signals with a frequency which will also be proportional to the motor speed. These signals are suitably amplified by conventional means 17 and supplied to a small synchronous motor 18 which is operated thereby at a speed which will be proportional to the frequency of the signals. The speed of the signal motor 18 is, therefore, a precise and a continuous indication of the speed of the motor 10 which is to be controlled and, when the speed of signal motor 18 is at a certain predetermined value, it will indicate that the motor 10 is operating at the desired speed.

To provide automatic control or speed regulation a reference motor 19 is employed. This, too, is a synchronous motor, identical to the motor 18. It is operated on a 60-cycle power line which thus provides a reference frequency whereby the reference motor 19 will operate at a substantially constant speed. The difference in speed between the motor 18 and 19 provides an indication of the error that exists in the speed of the drive motor 10. This difference is converted into a physical quantity by connecting the two synchronous motors to the input shafts of the mechanical differential 20. The differential is of conventional design and may be of any known kind as, for example, the bevel-gear type or the spur-gear type. The output of the differential 20 is a shaft speed whose magnitude and direction are a measure of the difference between the speeds of the two synchroernous motors 18 and 19. The output shaft of the differential is connected to drive a rheostat or variable resistor 21. This rheostat should preferably be of the rotary type in which the complete range of resistances is obtainable by several complete rotations of the control shaft. Such a type is the Helipot potentiometer, manufactured by the Helipot Corporation. The connection between the output shaft of the differential and the rheostat is through a friction or slip clutch (not shown). This is to permit the clutch to provide a substantially positive drive until the rheostat or potentiometer reaches a limit after which it allows slippage to avoid damage to the resistor. A further safety scheme that may be utilized is to apply a magnetic brake to the rheostat shaft and to put protective relays across the inputs to each of the two synchronous motors whereby, should either motor lose its excitation, the magnetic brake would operate and lock the rheostat so the machine or motor 10 could continue to operate without speed control.

The armature of motor 10 is energized by the direct current received from the amplidyne generator 24 which is driven by the motor 26. The latter motor may be of any type whose operating characteristics are well adapted to constant-speed work. A motor well suited for this purpose is the alternating-current induction motor. The amplidyne generator, as is well known, is a direct-current generator which also functions as a rotating amplifier. The amplidyne generator utilizes a weak control field 23 which when cut by the armature windings generates a voltage at the quadrature axis brushes which when shorted causes a current to flow through the armature conductors producing a strong armature flux or secondary field which is at right angles to the control field. The armature windings passing through the secondary field generates a second and considerably greater voltage at the direct axis brushes from which is tapped the direct current which is supplied to the armature of the motor 10. A compensating winding 25 is inserted in the circuit, as shown, to neutralize any tendency of the direct current from the amplidyne setting up its own armature flux in opposition to the control flux. It will thus be apparent that any small change in the excitation of the control field 23 will result in an immediate and proportional, although highly amplified, change in the current generated by the amplidyne.

To effect changes in the control field 23 in response to variations in the speed of the motor 10 which is to be controlled, the rheostat 21 is connected in series with the control field. Since the rheostat is automatically set in response to the difference in speeds of the two synchronous motors 18 and 19, it will be understood that any departure of the speed of motor 10 from the preset value will result in a resetting of the rheostat 21 which will increase or decrease the current in the control circuit 22, as the case may be, to increase or decrease the excitation of the control field 23 which, in turn, will result in a considerably amplified increase or decrease in the output of the amplidyne generator. Since this output is supplied to the armature of motor 10, the speed thereof will be automatically corrected until the speed of the signal motor 18 again equals that of the reference motor 19 whereupon the output shaft of differential 20 will cease to rotate and the resistance of the rheostat will remain fixed. The output of the amplidyne will then remain constant until a change in the speed of motor 10 again upsets the balance of the system.

The correction which the above-described device applies is not only inherently accurate but is applied with a slow and smooth action. When this regulator device is employed in connection with photographic emulsion coating machines, this type of slow and smooth operation precludes the introduction of crosslines resulting from sudden variations in emulsion thickness caused by the sudden and spasmodic application of correction to the speed of the drive motor. To this end, the present device is designed to require a certain definite time for the regulator to bring the speed back to substantially the desired value. This time will be in the neighborhood of several seconds and it, too, may be varied by changing the gear ratios between the two synchronous motors 18 and 19 and the differential 20. A change in the time required for correction does not affect the accuracy of the control.

As above mentioned, the herein-described device does not afford a continuously variable, stepless choice of speeds but holds a machine to the single speed which is determined by the characteristics of the radially ruled disc which is driven by the motor to be controlled. The number of lines on the disc will in fact determine the speed at which the motor will be controlled since the greater the number of lines, the greater will be the frequency of the signals generated by the photoelectric means. For example, to double the speed at which the motor is to be controlled will require the substitution of a ruled disc having half the number of radial lines. Thus, to change the speed at which the motor will be held requires nothing more than the substitution of a different disc of appropriate design. For the purpose of this device, the discs employed may comprise the conventional stroboscopic discs which are ordinarily used for visually checking speed by viewing a stroboscopic light therethrough.

Certain components of the regulator device may be replaced by other units which in certain appliaction of the device may be acceptable. For instance, the amplidyne generator, which functions as both an amplifier and a generator, may be replaced by some other type of amplifier, such as an electronic amplifier. Similarly the frequency signal may be obtained by magnetic scanning or from an alternating-current tachometer generator attached to the motor to be controlled. However, I definitely prefer the described photoelectric arrangement since this puts no additional load on the motor under control and is extremely versatile and reliable, permitting speed regulation over considerable ranges and at any number of speeds, determined only by the number of ruled discs at hand. Again, it is possible to eliminate the photoelectric pickup and the signal motor entirely by gearing the differential to the shaft of the motor to be controlled but this arrangement has the definite disadvantage of placing an additional load on the motor being controlled and, moreover, the versatility of the device is lost since the control is operative at a single speed determined by the mechanical connection between the motor and the differential.

From the foregoing description it will be apparent that I have provided means for obtaining all the objects and advantages of this invention.

What I claim and sedise to secure by Letters Patent of the United States is:

1. A speed regulator for a drive motor comprising photoelectric means actuated by the rotation of said motor to generate signals whose frequency is proportional to the speed of said motor, means for amplifying said signals, a reference motor and a signal motor, the reference motor being adapted to be operated on a power line providing a reference frequency and the signal motor being adapted to be operated by said amplified signals, a differential mechanically coupled to the reference and signal motors, a rheostat mechanically coupled to the output of said differential to be controlled thereby, an amplidyne generator and means to drive the same, said amplidyne generator having a control field connected to said rheostat whereby the field excitation may be varied, and the output of said amplidyne generator being connected to said drive motor.

2. A speed regulator for a drive motor comprising a source of illumination, photoelectric means, means driven by said motor and positioned relative to the source of illumination and to the photoelectric means whereby the latter is intermittently illuminated by the source of illumination to generate signals, the frequency of which is proportional to the speed of said motor, a signal motor whose speed of operation is controlled by the signals generated by said photoelectric means, a reference motor adapted to be operated on a power line providing a reference frequency whereby said reference motor will run at a predetermind sped, a differential mechanically coupled to both the reference and signal motors, a rheostat mechanically coupled to the output of said differential to be controlled by said output, an amplidyne generator and means to drive the same, said amplidyne generator having a control field in circuit with said rheostat whereby the field excitation may be varied, and the output of said amplidyne generator being connected to said drive motor.

3. A speed regulator for a drive motor comprising photoelectric means actuated by the rotation of said motor to generate signals whose frequency is proportional to the speed of said motor, means for amplifying said signals, a signal motor adapted to be operated by said amplified signals, a reference motor adapted to be operated on a power line providing a reference frequency, a differential mechanically coupled to both the reference and signal motors, a source of current for operating said drive motor, and means including a rheostat adapted to control the amplitude of said curernt, said rheostat being mechanically coupled to the output of said differential to be controlled thereby.

4. A speed regulator for a motor comprising a source of illumination, photoelectric means, means driven by said motor and positioned relative to the source of illumination and to the photoelectric means whereby the latter is intermittently illuminated by the source of ilumination to generate signals, the frequency of which is proportional to the speed of said motor, a signal motor whose speed of operation is controlled by the generated signals, a reference motor adapted to be operated from a current supply having a substantially constant frequency whereby the reference motor will run at a predetermined speed, a differential having a pair of input shafts and an output shaft, said reference and signal motors being coupled to said input shafts, a source of current for operating the motor whose speed is to be regulated, and means including a rheostat adapted to control the value of the latter current, said rheostat being coupled to said differential output shaft.

5. A speed regulator for a motor comprising a photoelectric cell, a source of illumination, means adapted to be driven by said motor and positioned in the path of light between the source of illumination and the photoelectric cell whereby intermittent signals are generated by the latter with a frequency proportional to the speed of said motor, means for amplifying said signals, a signal motor adapted to be operated by said amplified signals, a reference motor adapted to be operated from a source of current having a substantially constant frequency whereby the reference motor will run at a predetermined speed, a differential having a pair of input shafts and an output shaft, said signal and reference motors being coupled to said input shafts, a rheostat coupled to said differential output shaft to be controlled thereby, an amplidyne generator and drive means therefor, said amplidyne generator having a control field in circuit with said rheostat whereby the field excitation may be varied, and the output of said amplidyne generator being connected to the motor to be regulated.

6. A speed regulator for a motor comprising photoelectric means actuated by the rotation of said motor to generate signals whose frequency is proportional to the speed of said motor, means for amplifying said signals, a signal motor adapted to be operated by said amplified signals, a reference motor adapted to be operated from a source of current having a substantially constant frequency whereby the reference motor will run at a predetermined speed, a differential having a pair of input shafts and an output shaft, said signal and reference motors being coupled to said input shafts, a control circuit, a rheostat in said control circuit adapted to vary the amplitude of the circuit current, said rheostat being coupled to said differential output shaft, and means for amplifying said control circuit current, the output of said second amplifying means being connected to the motor to be regulated.

7. A speed regulator for a drive motor comprising a photoelectric cell, a source of illumination, a scanning disc adapted to be driven by said motor and positioned in the path of light between the source of illumination and the photoelectric cell whereby signals are generated by the latter with a frequency proportional to the speed of said motor, means for amplifying said signals, a synchronous motor adapted to be operated by said amplified signals, a second synchronous motor adapted to be operated from a current supply having a substantially constant frequency whereby said second synchronous motor will run at a constant predetermined speed, a differential having a pair of input shafts and an output shaft, said two synchronous motors being coupled to said input shafts, a rheostat coupled to said differential output shaft to be controlled thereby, an amplidyne generator and drive means therefor, said amplidyne generator having a control field in circuit with said rheostat whereby the field excitation may be varied, and the output of said amplidyne generator being connected to said drive motor.

References Cited in the file of this patent

UNITED STATES PATENTS

| | | |
|---|---|---|
| 1,932,073 | James | Oct. 24, 1933 |
| 2,171,996 | Schultz | Sept. 5, 1939 |